United States Patent [19]

Lespade et al.

[11] Patent Number: 5,240,887
[45] Date of Patent: Aug. 31, 1993

[54] HEAT TREATMENT METHOD FOR SILICON AND CARBON-CONTAINING CERAMIC FIBERS AND FIBERS OF THE SAME KIND WITH A LAMINATED STRUCTURE

[75] Inventors: Pierre Lespade, Merignac; Alain Guette, le Bouscat; Erik Menessier, Tarbes; René Pailler, Cestas, all of France

[73] Assignee: Aerospatiale Societe Nationale Industrielle, Paris, France

[21] Appl. No.: 397,762

[22] Filed: Aug. 23, 1989

[30] Foreign Application Priority Data

Aug. 26, 1988 [FR] France .................. 8811245

[51] Int. Cl.⁵ .............................................. C04B 35/04
[52] U.S. Cl. ............................................. 501/90; 501/95
[58] Field of Search .................................. 501/90, 95

[56] References Cited

U.S. PATENT DOCUMENTS 4,746,480  5/1988  Clark .................................... 264/62

FOREIGN PATENT DOCUMENTS 0275652  7/1988  European Pat. Off. .
2080781  2/1982  United Kingdom .

OTHER PUBLICATIONS

J. J. Lannutti and D. E. Clark, "Sol-Gel Derived Coatings on SiC and Silicate Fibers", *6045 Ceramic Engineering and Science Proceedings*, 5(1984) Jul.-Aug. No. 7/8, pp. 574-582.
*American Ceramic Society Bulletin*, vol. 66, No. 8, 1987, Westerville, Ohio, USA.

*Primary Examiner*—Mark L. Bell
*Assistant Examiner*—Deborah Jones
*Attorney, Agent, or Firm*—Hodgson, Russ, Andrews, Woods & Goodyear

[57] ABSTRACT

The invention is related to a heat treatment method for silicon and carbon-containing ceramic fibers as well as fibers of the same nature with a laminated structure and having an external carbon layer.

The processing method for the invention comprises a heat treatment in vacuum, during at least three hours and at a temperature of about 1000° C. This treatment yields fibers surrounded with a layer of endogenic $SiO_2$, that is itself coated with a layer of endogenic carbon.

Said fibers can be used to make composite materials with fiber reinforcement.

2 Claims, No Drawings

HEAT TREATMENT METHOD FOR SILICON AND CARBON-CONTAINING CERAMIC FIBERS AND FIBERS OF THE SAME KIND WITH A LAMINATED STRUCTURE

TECHNICAL FIELD

This invention is realed to a heat treatment method for silicon and carbon, more particularly SiC-containing ceramic fibers. It is also related to fibers of a laminated structure that can be obtained by such a processing method.

BACKGROUND OF THE INVENTION

SiC-containing fibers are more particularly used in the fields of aviation, aerospace supplies and of surface vehicles as reinforcement fibers for composite materials, and more particularly the composite materials having a ceramic matrix (C.M.C.)

The thermal and mechanical properties of these composite materials above all depend on the properties of the fiber reinforcement, (for instance, fibers containing aluminum oxide or silicon carbide) and of a matrix/fiber interfaces. As a rule, the strength of fiber solids having some degree of brittleness is widely dependent on the presence of surface defects. They require a fiber surface protection during the production and use of CMC.

From a chemical point of view, a ceramic fiber is normally exposed to the action of four different chemical media:

the reactants which are used to form the matrix according to a processing method involving liquid or gas phases.
the ceramic matrix,
the interphase that can be resorted to control the fiber/matrix bonding and to obtain a high toughness, and
the gas atmosphere (air, for instance)

According to their nature, the above media can react with the fibers at high temperature and cause a decrease of the reinforcing capability thereof.

These reactions may cause serious alterations in the fiber surface defects, enlarging some existing defects or creating new ones, and thereby they reduce the failure strength of the fiber.

In order to protect the fibers against these reactions and also to improve their mechanical properties and make them less dependent towards the matrix, it is known to coat the fiber surface with a layer that forms an interphase. For instance, this interphase may be a pyrocarbon or a hexagonal boron nitride. In some cases, when the production of the composite material requires sufficiently high temperatures, the interphase may be created during the production process of the composite material. In this way, a carbon interphase is created in composite materials having a matrix of lithium aluminosilicate with SiC-containing reinforcement fiber. (J. J. BRENNAN Tailoring Multiphase and Composite Ceramics, Material Science Research, RE. TESSLER and al. p. 549-560, Plenum Press, New York, 1986).

However, the use of these deposits is not entirely satisfactory more particularly in the case of composite materials obtained by the soil/gel process.

Now, the Applicant has been able to develop a processing method for a silicon and carbon containing ceramic fiber and more particularly a SiC-containing ceramic fiber having for its purpose to eliminate the disadvantages of the previous art and to create an external carbon coating.

DISCLOSURE OF THE INVENTION

According to the present invention, there is provided a heat treatment in vacuum during a minimum period of approximately three hours at a temperature of about 1000° C.

Preferably, the treatment is carried out during a period adequate to give a laminated structure with an external layer of carbon. The duration of the period is obviously dependent on the physical and chemical characteristics of the fiber involved. However, it has been established that a duration of approximately sixty hours gives satisfactory results, particularly in the case of fibers from oxygen crosslinked polycarbosilane.

Of course, the heat treatment according to the invention can be applied to long fibers both in unwoven and in multidirectional woven forms and also to short or long fibers in random arrangement.

According to one embodiment of the invention, the fiber containing silicon and carbon, and more particularly SiC, includes oxygen and excess carbon. In this case, the heat treatment gives the possibility to obtain fibers within a layer of endogenic $SiO_2$, which in turn is coated with a layer of endogenic carbon.

Therefore, these fibers present an original structure per se and also form an object of the present invention.

The $SiO_2$ layer may originate in the oxidization of the silicon carbide as follows:

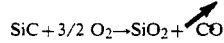

$$SiC + 3/2\, O_2 \rightarrow SiO_2 + CO\uparrow$$

with oxygen contained in the SiC-containing fiber.

The growth of the carbon coating is due to excess carbon within the fiber. It gives the fiber a smooth appearance without any defect.

Fibers are preferably obtained from an organometallic precursor such as a polycarbosilane which is advantageously oxygen crosslinked.

With a treatment lasting approximately 60 hrs., the thickness of the silica layer is about 500-1000 Å and the thickness of the carbon layer is about 100-500 Å.

The fibers processed according to the invention permit to advantageously reinforce the ceramic-matrix composite materials and to consider their use in new technical fields on account of their properties, that is freedom of defect and high failure strength.

The features of the present invention will become apparent from the following example of embodiment given for the purpose of illustration alone. The example was carried out both in air and in vacuum in order to make a comparison of results and establish the interest of using vacuum.

The example was made with silicon carbide-containing ceramic fibers (for instance, a Nicalon fiber produced by Nippon Carbon) produced by spinning, crosslinking and pyrolysis in inert atmosphere of a precursor of polycarbosiliane type. In order to give polycarbosilane fibers infusibility properties, an oxygen crosslinking treatment is carried out prior to the pyrolysis. In consequence the silicon carbide containing fibers obtained by this approach comprise significant volumes of oxygen, (as an illustration, the atomic composition of the NLM 202 fibers used in the example below is: 37.0% Si, 47.9% C and 15.1% O). When the pyrolysis of the polycarbosilane is conducted at low temperature (less than 1000° C. for instance), the fiber is amorphic and consists of Si(C,O)$_4$ tetrahedral units. When the pyrolysis temperatures are higher, there is, within the amorphous matrix, a growth of very small-sized crystallites of filiscon carbide and free carbon. In the SiC-containing fibers of Nicalon type, the crystallization process is not completed. This warrants that the fibers show an excellent mechanical strength at room temperature, while they may change when treated at high temperatures.

EXAMPLE

Heat treatments, of three and sixty hours in duration, were carried out at 1000° C., either in air, or in vacuum-sealed quartz glass ampules, on fiber tufts of Nicalon (comprising approximately 500 monofilaments with a diameter averaging 14$\mu$). Tensile failure strength values were read at room temperature on bundles of each 40 monofilaments taken from the tufts, sample length 50 mm. Tensile stress values were statistically analyzed by means of the Weibull function and were characterized by their median Tr(0.5) and their Weibull modulus(m)(W. I. WEIBULL, Appl. Mech., vol.18, (1951),p. 293-397). They were then correlated with the variations in the external fiber structure caused by the heat treatment, by methods of scanning electron microscope and Auger electro spectrometer microanalysis.

The results of the tensile tests conducted on monofilaments are listed in the Table 1 below:

TABLE 1

Influence of heat treatment at 1000° C. on the failure strength at room temperature of fibers.

|  | Untreated fibers | Vacuum treat. (3 hrs) | Vacuum treat. (60 hrs) | Air treat. (60 hrs) |
|---|---|---|---|---|
| $T_r(0.5)$ (MPa) | 1880 | 1810 | 2865 | 795 |
| m | 4.8 | 5.7 | 4.0 | 2.6 |

It becomes apparent that a short duration vacuum treatment does not significantly change the average failure stress of fibers. By contrast, it slightly increases the Weibull modulus (m).

On the contrary, when the duration of the treatment is considerably longer (i.e. 60 hours), the changes in the failure strength of the fibers are much more apparent and depend on the nature of the gas atmosphere. When in air, the treatment lowers both the average failure stress value and the Weibull modulus. In fact, it is equivalent to giving the fiber defects of greater size in comparison with the original defects. An analysis of the fiber surface permits to establish the origin of the new defects. Air treatment for a long time results in the growth of a relatively thick silica layer (e=0.4$\mu$) on the fiber source with the disadvantage, among others, to hinder the release of the carbon monoxide generated.

When the long treatment is carried out in vacuum, the fiber structure is no longer subjected to mechanical deterioration, and the average failure stress value is increased by about 50% without a substantial change in the value of Weibull modulus. An analysis of the fiber shows that its surface is smooth and presents a thin carbon film (approximately 100 Å) over a layer of silica that is much less than before (approximately 500 Å). The increase in the fiber failure strength is presumably associated mainly to the alterations of its surface (closing up of certain surface defects, protective action by the carbon film), while an internal modification is not to be ruled out entirely.

Owing to the excellent mechanical properties of the fibers treated in this way, they can be advantageously used in the preparation of fiber reinforced composite materials.

What is claimed is:

1. A method of producing laminated silicon carbide-containing ceramic fibers which consists essentially of subjecting silicon carbide-containing ceramic fibers, previously obtained from polycarbosilane fibers cross-linked with oxygen, to a heat treatment at a temperature of about 1000° C., in a vacuum, for at least three hours to produce laminated silicon carbide-containing ceramic fibers, which are coated with an endogenic SiO$_2$ intermediate layer, which in turn is coated with an external layer of endogenic carbon.

2. The method of claim 1, wherein the heat treatment is carried out during a period of approximately 60 hours.

* * * * *